United States Patent [19]
Ito et al.

[11] Patent Number: 5,145,734
[45] Date of Patent: Sep. 8, 1992

[54] WOVEN FABRIC HIGH-PURITY ALUMINA CONTINUOUS FILAMENT, HIGH-PURITY ALUMINA FILAMENT FOR PRODUCTION THEREOF, AND PROCESSES FOR PRODUCTION OF WOVEN FABRIC AND CONTINUOUS FILAMENT

[75] Inventors: Takashi Ito, Nara; Osamu Iwasaki, Daito; Akimicu Ohuchi, Gunma; Koichiro Otomo, Moriguchi; Yoshiaki Saito, Tochigi, all of Japan

[73] Assignees: Kanebo Limited; Mitsui Mining Company, Limited, both of Tokyo, Japan

[21] Appl. No.: 651,412
[22] PCT Filed: Jun. 8, 1990
[86] PCT No.: PCT/JP90/00751
§ 371 Date: Feb. 7, 1991
§ 102(e) Date: Feb. 7, 1991
[87] PCT Pub. No.: WO90/15175
PCT Pub. Date: Dec. 13, 1990

[30] Foreign Application Priority Data

Jun. 8, 1989 [JP] Japan .................................. 1-145863
Jun. 8, 1989 [JP] Japan .................................. 1-145864
Jun. 8, 1989 [JP] Japan .................................. 1-145865
Jun. 12, 1989 [JP] Japan .................................. 1-148666

[51] Int. Cl.$^5$ .............................................. D03D 3/00
[52] U.S. Cl. ................................ 428/229; 139/420 A; 139/425 R; 428/225; 428/245; 428/257; 428/258; 428/259; 428/297; 428/367; 428/378; 428/408; 428/413; 428/418; 428/902

[58] Field of Search ...................... 139/425 R, 420 A; 428/225, 257, 258, 259, 378, 413, 418, 408, 367, 902, 245, 297, 416, 229

[56] References Cited

U.S. PATENT DOCUMENTS

| | | | |
|---|---|---|---|
| 4,752,515 | 6/1988 | Hosoi et al. | 428/300 |
| 4,812,271 | 3/1989 | Hoba et al. | 264/63 |
| 4,929,578 | 5/1990 | Sowman | 264/63 |

FOREIGN PATENT DOCUMENTS

| | | |
|---|---|---|
| 60-126354 | 7/1985 | Japan . |
| 60-139875 | 7/1985 | Japan . |
| 63-75117 | 4/1988 | Japan . |
| 63-135535 | 6/1988 | Japan . |

*Primary Examiner*—James J. Bell
*Attorney, Agent, or Firm*—Paul & Paul

[57] ABSTRACT

Disclosed are a high-purity alumina continuous filament woven fabric comprising a high-purity alumina continuous filament having an alumina content of at least 95% by weight and a filament diameter of 5 to 20 μm, a hybrid woven fabric comprising this high-purity alumina continuous filament and a high-strength continuous filament having a tensile strength of at least 200 kg/mm$^2$, processes for the preparation of these woven fabrics, a high-purity alumina continuous filament valuable for the production of these woven fabrics, and a process for the preparation of this high-purity alumina continuous filament. These woven fabrics are very useful as a reinforcing fibrous substrate of a fiber-reinforced composite material or as a heat-insulating material.

34 Claims, No Drawings

WOVEN FABRIC HIGH-PURITY ALUMINA CONTINUOUS FILAMENT, HIGH-PURITY ALUMINA FILAMENT FOR PRODUCTION THEREOF, AND PROCESSES FOR PRODUCTION OF WOVEN FABRIC AND CONTINUOUS FILAMENT

TECHNICAL FIELD

The present invention relates to a woven fabric comprising a high-purity alumina continuous filament, which is used as a reinforcing fibrous substrate of a fiber-reinforced composite material or as a heat-insulating material, a high-purity alumina continuous filament used for the production of this woven fabric, and processes for the production of these woven fabric and continuous filament.

BACKGROUND ART

The alumina content is up to 95% by weight in conventional alumina continuous filament woven fabrics, and this is because a fiber composed of high-purity alumina having an alumina content of at least 95% by weight is very brittle, and thus it is difficult to prepare a continuous filament from this alumina fiber, and even if a high-purity alumina continuous filament is obtained, it is difficult to form a woven fabric from this continuous filament by using a loom.

An alumina continuous filament heretofore used for woven fabrics comprises a silica ($SiO_2$) component and the like, and generally has an alumina content of 75 to 80% by weight, the alumina content is 95% by weight at highest. This alumina continuous filament generally has a tensile strength of 150 to 200 kg/mm$^2$ and is less brittle than the high-purity alumina continuous filament having an alumina content of at least 95% by weight, and thus this continuous filament can be woven relatively easily. Nevertheless, the modulus of elasticity of this alumina continuous filament is generally 15 to 20 t/mm$^2$, and is much lower than 30 to 45 t/mm$^2$ of the high-purity alumina fiber, and this alumina continuous filament has a disadvantage of a low heat resistance. Accordingly, a woven fabric formed by using an alumina continuous filament having an alumina content lower than 95% by weight has a disadvantage in that only a composite material having a low modulus of elasticity and a low heat resistance is obtained, even if it is used as a reinforcing fibrous substrate of a fiber-reinforced plastic, metal or ceramic material. Thus, a woven fabric formed by using a high-purity alumina continuous filament is highly suitable as a reinforcing fibrous substrate.

It is expected that, if a hybrid woven fabric is obtained by combining a high-purity alumina continuous filament having a very high tensile modulus of elasticity with a high-strength continuous filament having a tensile strength of 200 kg/mm$^2$ or higher, this woven fabric will have superior physical properties such a high strength, and a high modulus of elasticity will be obtained, and this woven fabric will be very satisfactory as a reinforcing fibrous substrate for a composite material.

As the process for preparing an alumina continuous filament composed mainly of alumina (an alumina content of at least 80% by weight), there can be mentioned, for example, a process in which a spinning solution comprising an aluminum salt, a water-soluble polysiloxane and a water-soluble polymer is spun and then calcined, a process in which a solution comprising an alumina sol, a silica sol and boric acid is spun as the spinning solution, and a process in which a mixture of an inorganic polymer having a polyaluminoxane (—Al—O—) group and a silicic acid ester is spun as the spinning solution. In each of these processes, however, a silica component ($SiO_2$) is incorporated in an amount of at least 5% by weight, to lessen the brittleness of the alumina fiber.

As the process for preparing a high-purity alumina fiber having an alumina content of at least 95% by weight, there is known a process in which a slurry comprising a-alumina particles having a particle size smaller than 0.5 tm, a small amount of $MgCl_2;6H_2O$ and a basic aluminum salt is dry-spun and the spun filament is calcined at a temperature higher than 1000° C., as proposed in Japanese Unexamined Patent Publication No. 49-35627. Also in the fiber obtained according to this process, the brittleness is generally lessened by a coating of amorphous $SiO_2$.

An alumina continuous filament woven fabric is prepared by weaving an alumina continuous filament prepared as mentioned above. At the warping step or picking step in the weaving process, the alumina continuous filament is brought into contact with a guide or the like, a filament breaking or a formation of fluffs occurs, and a good weave becomes difficult. As the weaving process in which a filament breaking or formation of fluffs is prevented, and the weaving property is improved, there is generally adopted a process in which an alumina continuous filament having a lesser brittleness due to an incorporation of a silica component or the like in an amount of at least 5% by weight, usually 15 to 25% by weight, is used. Furthermore, Japanese Unexamined Patent Publication No. 62-170522 proposes a process in which a precursor fiber obtained by spinning a spinning solution containing a precursor is woven, and the woven fabric is heat-treated to obtain an alumina continuous filament woven fabric. Nevertheless, also in the fiber of the woven fabric obtained according to this process, the alumina content is restricted to less than 95% by weight because of problems arising in the preparation of the precursor, and since the calcination is carried out after the weaving, the mesh of the obtained woven fabric is loose and shearing readily occurs.

As pointed out above, since a high-purity alumina continuous filament is very brittle, it is very difficult to form a woven fabric from this continuous filament by using a loom. Accordingly, only a woven fabric having an alumina content lower than 95% by weight has been provided as the woven fabric comprising an alumina continuous filament, and a satisfactory woven fabric comprising a high-purity alumina continuous filament having an alumina content of at least 95% by weight, or a weaving process for forming such a woven fabric stably at a high efficiency, have not been proposed.

DISCLOSURE OF THE INVENTION

The inventors of the present invention made an investigation into the foregoing problems, and as a result, completed the present invention. Therefore, an object of the present invention is to provide a woven fabric comprising a high-purity alumina continuous filament having a high strength, a high modulus of elasticity, and a high heat resistance and suitable for use as a reinforcing substrate for a fiber-reinforced composite material, a high-purity alumina continuous filament suitable for use for the production of this unwoven fabric, and processes for preparing these woven fabric and continuous filament.

According to the present invention, to attain this object, there is provided a high-purity alumina continuous filament woven fabric comprising a high-purity alumina continuous filament having an alumina content of at least 95% by weight and a filament diameter of 5 to 20 tm.

According to a second aspect of the present invention, there is provided a high-purity alumina continuous filament hybrid woven fabric comprising a high-purity alumina continuous filament having an alumina content of at least 95% by weight and a filament diameter of 5 to 20 $\mu$m and a high-strength continuous filament having a tensile strength of at least 200 kg/mm$^2$.

According to a third aspect of the present invention, for obtaining a high-purity alumina continuous filament woven fabric as mentioned above, there is provided a process for the preparation of a high-purity alumina continuous filament woven fabric, which comprises weaving a high-purity alumina continuous filament having an alumina content of at least 95% by weight and a filament diameter of 5 to 20 $\mu$m, wherein an epoxy resin is applied to the high-purity alumina continuous filament.

According to a fourth aspect of the present invention, there is provided a process for the preparation of a high-purity alumina continuous filament hybrid woven fabric, which comprises weaving a high-purity alumina continuous filament having an alumina content of at least 95% by weight and a filament diameter of 5 to 20 $\mu$m and a high-strength continuous filament having a tensile strength of at least 200 kg/mm$^2$ to form a hybrid woven fabric, wherein an epoxy resin is applied to the high-purity alumina continuous filament.

According to a fifth aspect of the present invention, there is provided a high-purity alumina continuous filament for weaving, which comprises a high-purity alumina continuous filament having an alumina content of at least 95% by weight and a filament diameter of 5 to 20 $\mu$m, which is coated with 1 to 7% by weight of an epoxy resin.

According to a sixth aspect of the present invention, for obtaining a high-purity alumina continuous filament as mentioned above, there is provided a process for the preparation of a high-purity alumina continuous filament for weaving, which comprises applying an epoxy resin to a high-purity alumina continuous filament having an alumina content of at least 95% by weight and a filament diameter of 5 to 20 $\mu$m and heat-treating the epoxy resin-applied continuous filament.

BEST MODE OF CARRYING OUT THE INVENTION

The high-purity alumina continuous filament used in the present invention has an alumina content of at least 95% by weight, preferably at least 98% by weight, most preferably at least 99.5% by weight. If the alumina content is lower than 95% by weight, the tensile modulus of elasticity and the heat resistance are low. The process for the preparation of this fiber is not particularly critical, but the process disclosed in Japanese Unexamined Patent Publication No. 63-75117 is preferably adopted. More specifically, the disclosed process is a process for the continuous preparation of an $\alpha$-alumina continuous filament in which an aqueous solution of a basic aluminum salt and a slurry comprising an alumina powder as the main component are used as the starting materials and an $\alpha$-alumina fiber is prepared through the step of forming a material to be spun, the spinning step, the calcining step and the firing step, and this process is characterized in that (a) at the step of forming a material to be spun, an alumina powder having an average particle size smaller than 0.1 $\mu$m in an amount of 10 to 40% by weight based on the total oxides in the product $\alpha$-alumina fiber, a spinning assistant in an amount of 4 to 10% by weight based on the total oxides and, if desired, a sintering agent in an amount of up to 3% by weight based on the total oxides are added to an aqueous solution of a basic aluminum salt to form a slurry and the water content is adjusted so that the slurry has a viscosity of 1,000 to 10,000 P at 25° C., (b) at the spinning step, the above material to be spun is dry-spun from a nozzle having a plurality of spinning holes at a speed of 5 to 50 m/min and when spun filaments are gathered and passed through a drying zone arranged in proximity to the nozzle, the spun filaments are dried at a temperature-elevating rate lower than 1,500° C./min at a highest temperature below 150° C. until a multifilament yarn composed of a precursor substance not substantially containing free water is formed, (c) at the calcining step, the multifilament yarn is passed through a calcining furnace comprising a first heating zone having a highest temperature of 250° to 500° C. and a second heating zone maintained at 700° to 900° C. without winding of the multifilament yarn, so that the ratio of the residence time of the multifilament yarn in the first heating zone to the residence time in the second heating zone is from 2/1 to 4/1, and the multifilament yarn which has passed through the second heating zone is calcined to form a calcined fiber still containing volatile substances in an amount of 15 to 25% by weight based on the entire filaments, (d) at the firing step, the volatile substances remaining in the calcined fiber are promptly volatilized at a temperature of 1,400° to 1,600° C., and the steps (b) through (d) are continuously conducted and the alumina content in the product is at least 95% by weight.

The high-purity alumina continuous filament used in the present invention has a filament diameter of 5 to 20 $\mu$m. If the filament diameter is larger than 20 $\mu$m, the obtained fiber is hard and has a poor softness, and many filament breakages occur at the weaving step. If the filament diameter is smaller than 5 $\mu$m, the softness is improved but the tenacity per filament is reduced, the fiber is easily damaged by rubbing or the like, and fluffs are readily formed. Accordingly, in each case, weaving is difficult.

The high-purity alumina continuous filament used in the present invention is composed of multiple filaments and the number of the constituent filaments is preferably 200 to 10,000, most preferably 300 to 5,000. A product formed by combining a plurality of such multi-filament yarns can be used according to need.

In general, an alumina fiber has higher modulus of elasticity and higher heat resistance than those of other inorganic fibers such as a glass fiber, a carbon fiber and a stainless steel fiber, and has better stability and higher electrically insulating property than those of inorganic fibers. Accordingly, a high-purity alumina continuous filament woven fabric as proposed here is suitable for use as a reinforcing fibrous substrate for a fiber-reinforced composite material, or as a heat-insulating material.

As the continuous filament having a tensile strength of at least 200 kg/cm$^2$, which is used for the hybrid woven fabric of the present invention, there can be mentioned inorganic fibers such as a glass fiber, a carbon fiber, a silicon carbide fiber and a Tyranno polytitanocarbosilane fiber, and organic fibers such as an ultra-high-molecular-weight polyethylene fiber and an aromatic polyamide fiber. The kind, the filament diameter and the like of the high-strength continuous filament to be used in combination with the high-purity alumina continuous filament can be appropriately selected according to the intended object. For example, if a heat-resistant fiber is used, the obtained hybrid woven fabric is effective as a heat-resistant fiber-reinforcing substrate.

In the high-purity alumina continuous filament woven fabric and hybrid woven fabric, the weave texture and the warp and weft densities can be appropriately selected according to the diameter of the filament bundle and the intended final use. The weave texture is not particularly critical, and for example, there can be mentioned a plain weave, a twill weave, a stain weave, and a gauze weave. The woven fabric of the present invention can be surface-treated with an appropriate resin or coupling agent according to the intended use.

In the hybrid woven fabric of the present invention, the warp-weft construction can be appropriately determined according to the ease or difficulty of weaving and the intended use. For example, there can be mentioned a woven fabric comprising warps composed of the high-purity alumina continuous filament and wefts composed of other fiber, a woven fabric having a reverse structure, and a hybrid woven fabric in which high-purity alumina continuous filaments and other filaments are arranged alternately or at intervals of several filaments to form warps and/or wefts. One kind or two or more kinds of the high-strength continuous filaments can be mix-woven with the high-purity alumina continuous filament. The amounts used of the respective fibers constituting the hybrid woven fabric of the present invention are appropriately determined in view of the characteristics of the fibers, the diameters of fiber bundles, the numbers of filaments, and the intended use. For example, if a woven fabric having a high strength is desired, the proportion of the high-strength continuous filament is increased, and if a woven fabric having a high modulus of elasticity is desired, the proportion of the high-purity alumina continuous filament is increased.

The hybrid woven fabric of the present invention can be used after it has been surface-treated with an appropriate resin or coupling agent according to need.

As the epoxy resin to be used for the preparation process and high-purity alumina continuous filament for weaving according to the present invention, there can be mentioned various resins such as a bisphenol A type epoxy resin, a novolak type epoxy resin, an alicyclic epoxy resin and a linear aliphatic epoxy resin. Among them, a bisphenol A type epoxy resin is preferably used. Preferably, the average molecular weight of the epoxy resin is 350 to 1,000, more preferably 380 to 900, most preferably 400 to 900. If the molecular weight is lower than 350, a required bundle-forming property cannot be attained in the high-purity alumina continuous filament. If the molecular weight is higher than 1,000, a homogeneous emulsion of the epoxy resin cannot be obtained and the formed emulsion has a poor stability.

In the process of the present invention, the epoxy resin-applied high-purity alumina continuous filament for weaving according to the present invention is used for weaving the high-purity alumina continuous filament. As the process for applying the epoxy resin to the high-purity alumina continuous filament in the present invention, there can be adopted a process in which the epoxy resin is dispersed and emulsified in water or is dissolved in an organic solvent to form a solution, the emulsion or solution is applied to the high-purity alumina continuous filament by such means as dipping, coating or spraying, and the continuous filament is heat-treated at a temperature of 200° to 250° C. for a treatment time of 30 to 100 seconds to cure the epoxy resin and bond it to the continuous filament. From the viewpoint of step safety, the epoxy resin is preferably applied in the form of an emulsion. The heat treatment conditions can be appropriately set. Nevertheless, if the treatment temperature is low and the treatment time is short, the epoxy resin is insufficiently cured, and if the treatment temperature is high and the treatment time is long, a good bundle-forming property is obtained but no softness is obtained. In each case, filament breaking or fluffing occurs at the weaving step and a good woven fabric cannot be obtained.

Where the epoxy resin is applied in the form of an emulsion, an emulsifier and a penetrant are incorporated in addition to the epoxy resin, and an antistatic agent and a smoothening agent are further incorporated according to need.

Any of emulsifiers capable of emulsifying the epoxy resin efficiently and stably can be used, and nonionic and anionic surface active agents can be used. Nonionic surface active agents, for example, polyoxyethylene alkyl ethers, polyoxyethylene alkyl esters and polyoxyethylene alkylphenyl ethers, are preferably used. As the penetrant, for example, an Na salt of a dialkyl sulfosuccinate can be mentioned.

As the antistatic agent, there can be mentioned, for example, anionic surface active agents such as a K salt of an alkyl phosphate, a K salt of a polyoxyethylene alkyl phosphate and an Na salt of an alkyl sulfonate. As the smoothening agent, there can be mentioned, for example, esterified oils such as oleyl oleate, oleyl laurate and oleyl palmitate, and polymeric activators such as a block type polyether (PO/EO block type polyether) and a random type polyether (PO/EO random type polyether).

In the process of the present invention, the epoxy resin-containing emulsion or solution is generally used at a concentration of 10 to 30% by weight. The respective components to be applied to the fiber are preferably materials that can be easily removed at the heat cleaning step described hereinafter.

The amount of the epoxy resin applied to the high-purity alumina continuous filament for weaving according to the present invention is preferably 1 to 7% by weight, based on the fiber and especially preferably 3 to 5% by weight based on the fiber. If the amount applied of the epoxy resin is smaller than 1% by weight, a satisfactory bundle-forming property, softness and smoothness cannot be obtained, and if the amount applied of the epoxy resin is larger than 7% by weight, a good bundle-forming property can be obtained and the softness is still insufficient.

If the above-mentioned epoxy resin is applied to the high-purity alumina continuous filament, respective filaments are gathered and become soft, and since the surfaces of the respective filaments are coated with the epoxy resin, the occurrence of yarn breaking or fluffing is controlled at the weaving step and the weaving operation can be performed efficiently and stably.

According to the process of the present invention, a high-purity alumina continuous filament woven fabric can be prepared by carrying out the weaving operation by using the epoxy resin-applied high-purity alumina continuous filament as warps and wefts. The obtained woven fabric having the epoxy resin applied thereto can be directly used, but where the woven fabric is used as the reinforcing substrate of the fiber-reinforced composite material, in general, the resin component is removed and the woven fabric is treated with a coupling agent according to need, and the treated woven fabric is then used.

To remove the resin component from the high-purity alumina continuous filament woven fabric prepared according to the above-mentioned process, for example, a heat cleaning treatment is carried out in air or an oxidizing atmosphere at 300° to 600° C. for 1 to 3 hours. The woven fabric from which the resin component is removed by this heat cleaning treatment is preferably used as a reinforcing fibrous substrate for fiber-reinforced metals or fiber-reinforced ceramics. The woven fabric which is treated with a coupling agent suitable for a matrix resin after the heat cleaning treatment is preferably used as a reinforcing fibrous substrate for a fiber-reinforced resin composite material.

The hybrid woven fabric comprising the high-purity alumina continuous filament can be obtained by weaving the high-purity alumina continuous filament for weaving and the high-strength continuous filament by using an appropriate loom. The kind of the fiber to be used as the warp or weft is appropriately determined in view of the intended use and the operation adaptability. The weave structure of fibers is not particularly critical. For example, different kinds of fibers are alternately arranged or different kinds of fibers are arranged at intervals of several filaments.

In the present invention, the weaving process is not particularly critical, and the weaving operation can be carried out according to procedures customarily adopted for carbon fibers and other inorganic fibers by using an appropriately selected known loom. A rapier loom is preferably used as the loom. The weave texture and the warp and weft densities are appropriately determined at the weaving step according to the intended use. A plain weave, a twill weave, a satin weave and a leno cloth can be mentioned as the weave texture.

Since the constituent fiber of the high-purity alumina continuous filament woven fabric of the present invention has an alumina content of at least 95% by weight and a filament diameter is 5 to 20 μm, the woven fabric of the present invention has a higher strength, a higher modulus of elasticity, and a higher heat resistance than known alumina continuous filament woven fabrics, and if the woven fabric of the present invention is used as a reinforcing fibrous substrate of a fiber-reinforced composite material, a composite material having a high strength, high modulus of elasticity and high heat resistance can be obtained, and this composite material can resist a high temperature when used as a heat-resistant material such as a heat-insulating material. Furthermore, the occurrence of filament breaking or fluffing is controlled and the woven fabric is soft and easy to handle. Accordingly, a composite having an excellent appearance can be obtained. Moreover, in the production of fiber-reinforced plastics, a coupling agent suitable for the matrix resin can be easily applied.

The hybrid woven fabric comprising the high-purity alumina continuous filament of the present invention has a high strength and a high modulus of elasticity and therefore, the hybrid woven fabric is very suitable for use as a reinforcing fibrous substrate of a fiber-reinforced composite material. Moreover, the occurrence of filament breaking or fluffing is controlled and the hybrid woven fabric is soft and easy to handle. Accordingly, the hybrid woven fabric is suitable for the production of a composite material having an excellent appearance and physical properties.

The high-purity alumina continuous filament for weaving according to the present invention has a high strength, high modulus of elasticity, and excellent heat resistance and less brittleness, and therefore, if the weaving operation is carried out by using this continuous filament, the occurrence of filament breaking and fluffing is conspicuously controlled and a high-purity alumina continuous filament woven fabric, the preparation of which is very difficult according to the conventional technique, can be stably formed at a high efficiency by using an appropriately selected known loom. The fiber of the present invention is preferably used for the production of a hybrid woven fabric with other fiber.

According to the woven fabric-preparing process of the present invention, a woven fabric comprising a high-purity alumina continuous filament having an alumina content of at least 95% by weight, the production of which is very difficult according to the conventional technique because the continuous filament is brittle, can be prepared. Moreover, according to the process of the present invention, occurrence of filament breaking or fluffing is conspicuously controlled at the weaving operation using the high-purity alumina continuous filament, and therefore, the weaving operation can be stably performed at a high efficiency by using a known loom.

The present invention will now be described in detail with reference to the following examples and comparative examples.

EXAMPLE 1

To 10 parts by weight of an aqueous solution of basic aluminum chloride (the salt content was 23.5% by weight as calculated as $Al_2O_3$) was added 1 part by weight of a γ-alumina powder having an average particle size of 0.02 μm (the Al purity was at least 97% by weight), and 6 parts by weight of an aqueous solution containing 5% by weight of polyethylene oxide having an average molecular weight of 600,000 to 1,100,000 was further added with stirring and the components were thoroughly mixed. The liquid mixture was concentrated under a reduced pressure to obtain a spinning material having a viscosity of about 6,500 P as measured at 25° C.

The obtained spinning material was spun from a nozzle having 1,000 spinning holes, each having a diameter of 0.5 mm, and the spun material was dried to obtain a precursor fiber comprising 1,000 filaments. The spinning speed was appropriately set to obtain an intended fiber diameter.

The fiber was then passed through a calcination furnace having a temperature distribution of from 300° to 800° C. to calcine the fiber. An inert atmosphere was maintained in the calcination furnace by introducing nitrogen into the calcination furnace. The calcined fiber was passed through a firing furnace maintained at 1,500° C. to fire the fiber and obtain a high-purity alumina continuous filament having an alumina content of 99.7% by weight. The filament diameter of the obtained high-purity alumina continuous filament was 5, 10, 18 or 24 μm.

Then, an epoxy resin emulsion comprising the ingredients shown below and having a concentration adjusted to 20% by weight was applied as a sizing agent to the high-purity alumina continuous filament by the roller touch method, and the continuous filament was heat-treated at 230° C. for 1 minute to obtain a starting fiber for weaving, to which 5% by weight of the sizing agent had been applied.

| Composition of Epoxy Resin Emulsion | |
|---|---|
| Component | Amount (parts by weight) |
| Epoxy Resin | |
| Epikote 828 (supplied by Yuka-Shell Epoxy) | 50 |
| Epikote 1001 (supplied by Yuka-Shell Epoxy) | 20 |
| Nonionic Surface Active Agent | |
| Polyoxyethylene alkylphenyl ether | 25 |
| Penetrant and Antistatic Agent | |
| Dialkyl sulfosuccinate | 5 |

This starting fiber was warped at a density of 15 filaments per inch according to customary procedures and wefts were picked at a density of 15 filaments per inch by a rapier loom to form a plain weave. Subsequently, the obtained woven fabric was subjected to heat cleaning at 600° C. for 1 hour in an electric furnace to decompose and remove the sizing agent and obtain a high-purity alumina continuous filament woven fabric.

The appearance of the obtained woven fabric was examined, and the tensile strength and modulus of elasticity were measured with respect to single filaments drawn up from the wefts and warps, and the average values were calculated. The results are shown in Table 1. When the filament diameter was larger than 20 μm, the filament breakages and fluffing were conspicuous, and the tensile strength and modulus of elasticity were low.

TABLE 1

| Run No. | Filament Diameter (μm) | Appearance of Woven Fabric | Tensile Strength (kg/mm$^2$) | Tensile Modulus of Elasticity (t/mm$^2$) |
|---|---|---|---|---|
| 1 | 5 | some filament breaking and fluffing | 123 | 26.5 |
| 2 | 10 | good | 135 | 28.5 |
| 3 | 18 | good | 130 | 28.0 |
| 4 | 24* | conspicuous filament breaking and fluffing | 90 | 23.1 |

Note:
*comparison

EXAMPLE 2

The spinning, calcination and firing were carried out in the same manner as described in Example 1 except that a starting spinning material formed by adding 1% by weight as TiO$_2$, based on the γ-alumina powder, of titanium chloride to the starting spinning material used in Example 1 was used, whereby a high-purity alumina continuous filament having an alumina content of 98.6% by weight and a filament diameter of 10 μm was prepared. The obtained fiber was coated with 5% by weight of the epoxy resin in the same manner as described in Example 1, whereby a high-purity alumina continuous filament for weaving was obtained.

The fiber was warped at a density of 18 filaments per inch according to customary procedures, and picking was carried out at a density of 18 wefts per inch by a rapier loom to form a satin weave. Then, in the same manner as described in Example 1, the heat cleaning treatment was carried out and a high-purity alumina continuous filament woven fabric was obtained. The appearance of the obtained woven fabric and the physical properties of the single filaments were as shown in Table 2.

COMPARATIVE EXAMPLE 1

An alumina continuous filament for weaving was prepared in the same manner as described in Example 1 except that an alumina continuous filament (supplied by Sumitomo Kagaku Kogyo) having an alumina content of 85% by weight, a filament diameter of 15 μm and a filament number of 1,000 was used instead of the high-purity alumina continuous filament used in Example 2 and was coated with 5% by weight of the epoxy resin. The weaving and heat cleaning were carried out in the same manner as described in Example 2, to obtain an alumina continuous filament woven fabric. The results were as shown in Table 2. The weaving property was good but the tensile modulus of elasticity was low.

COMPARATIVE EXAMPLE 2

The spinning, calcination and firing were carried out in the same manner as described in Example 2 except that the amount of titanium chloride added to the starting spinning material was changed to 5% by weight as TiO$_2$, whereby an alumina continuous filament having a filament diameter of 10 μm and an alumina content of 94.5% by weight was obtained.

Subsequently, in the same manner as described in Example 2, the epoxy resin was applied and the weaving and heat cleaning treatments were carried out, whereby an alumina continuous filament woven fabric was obtained. The results were as shown in Table 2. The weaving property was good, but the tensile strength and tensile modulus of elasticity were low.

TABLE 2

| | Alumina Content (% by weight) | Appearance of Woven Fabric | Tensile Strength (kg/mm$^2$) | Tensile Modulus of Elasticity (t/mm$^2$) |
|---|---|---|---|---|
| Example 2 | 98.6 | good | 133 | 28.5 |
| Comparative Example 2 | 85.0 | good | 137 | 18.5 |
| Comparative Example 2 | 94.5 | good | 88 | 22.3 |

EXAMPLE 3

A fiber for weaving was obtained in the same manner as described in Example 1 (Run No. 2) except that, when the epoxy resin-containing emulsion was applied to the high-purity alumina continuous filament, by changing the rotation number of the roller appropriately, the amount of the epoxy resin applied to the fiber was adjusted as shown in Table 3, and the fiber was further treated in the same manner as described in Example 1 to obtain a high-purity alumina continuous filament woven fabric.

The appearance of the woven fabric was examined, and with respect to warps and wefts drawn up from the woven fabric, the tensile strength and tensile modulus of elasticity were measured and the average values were calculated. The results are shown in Table 3. It was confirmed that the amount of the epoxy resin applied to the high-purity alumina continuous fiber is preferably 1 to 7% by weight, especially preferably 3 to 5% by weight.

TABLE 3

| Run No. | Amount of Applied Epoxy Resin (% by weight) | Appearance of Woven Fabric | Tensile Strength (kg/mm$^2$) | Tensile Modulus of Elasticity (t/mm$^2$) |
| --- | --- | --- | --- | --- |
| 1 | 0.5 | conspicuous filament breaking and fluffing | 95 | 23.4 |
| 2 | 1 | slight filament breaking and fluffing | 125 | 26.3 |
| 3 | 3 | good | 138 | 28.0 |
| 4 | 5 | good | 135 | 28.5 |
| 5 | 7 | slight filament breaking and fluffing | 120 | 27.1 |
| 6 | 10 | weaving difficult | — | — |

EXAMPLE 4

A high-purity alumina continuous filament having an alumina content of 99.7% by weight and a filament diameter of 6, 10, 18 or 24 μm was prepared in the same manner as described in Example 1.

An epoxy resin-containing emulsion having the same composition as described in Example 1 was applied to the high-purity alumina continuous filament by the roller touch method and the continuous filament was heat-treated at 230° C. for 1 minute to obtain starting fibers for weaving, to which 5% by weight of the epoxy resin was applied and which had different filament diameters.

Each starting fiber was warped at a density of 15 filaments per inch according to customary procedures and a carbon fiber (Treca T-300-1K supplied by Toray) was picked as wefts at a density of 15 filaments per inch by a rapier loom to form a plain weave, whereby a high-purity alumina fiber/carbon fiber hybrid woven fabric was obtained. The appearance of the obtained woven fabric was examined, and the tensile modulus of elasticity of warps (high-purity alumina fiber) drawn up from the woven fabric and the tensile strength of wefts (carbon fiber) drawn up from the woven fabric were measured. The results are shown in Table 4. It was found that the high-purity alumina continuous filament having a filament diameter larger than 20 μm had a poor tensile modulus of elasticity.

TABLE 4

| Run No. | Filament Diameter (μm) | Appearance of Woven Fabric | Tensile Modulus of Elasticity of Warp (t/mm$^2$) | Tensil Strength of Weft (kg/mm$^2$) |
| --- | --- | --- | --- | --- |
| 1 | 6 | good | 28.3 | 280 |
| 2 | 10 | good | 28.5 | 280 |
| 3 | 18 | good | 28.0 | 280 |
| 4* | 24 | conspicuous filament breaking and fluffing | 23.1 | 280 |

Note
*comparison

EXAMPLE 5

The spinning, calcination and firing were carried out in the same manner as described in Example 1 except that a starting spinning material obtained by adding titanium chloride in an amount of 1% by weight as TiO$_2$, based on the 7-alumina powder, to the starting spinning material used in Example 1 was used, whereby a high-purity alumina continuous filament having an alumina content of 98.6% by weight and a filament diameter of 10 μm was obtained. In the same manner as described in Example 1, 5% by weight of the epoxy resin was applied to the obtained fiber, whereby a high-purity alumina continuous filament for weaving was obtained.

Then, an aromatic polyamide fiber (Kevler K-49-1140d-965 supplied by Du Pont) was warped at density of 15 warps per inch according to customary procedures, and then, the high-purity alumina continuous filament was picked at a density of 15 wefts per inch to form a plain weave, whereby an aromatic polyamide fiber/high-purity alumina fiber hybrid woven fabric was obtained. The appearance of the obtained woven fabric was examined, and the tensile strength of warps (aromatic polyamide fiber) drawn up from the woven fabric and the tensile modulus of elasticity of wefts (high-purity alumina fiber) drawn up from the woven fabric were measured. The results are shown in Table 5.

COMPARATIVE EXAMPLE 3

The spinning, calcination and firing were carried out in the same manner as described in Example 1 except that the amount added of titanium chloride was changed to 5% by weight as TiO$_2$, whereby an alumina continuous filament having an alumina content of 94.5% by weight and a filament diameter of 10 tm was obtained. Then, 5% by weight of the epoxy resin was applied to the obtained fiber in the same manner as described in Example 1 to form an alumina continuous filament for weaving.

Then, an aromatic polyamide fiber/alumina fiber hybrid woven fabric was prepared by carrying out the weaving operation in the same manner as described in Example 5. The appearance of the obtained woven fabric and the physical properties of the filaments were determined in the same manner as described in Example 5. The results are shown in Table 5. It was found that the tensile modulus of elasticity of the alumina continuous filament as the weft was lower than in the woven fabric of the present invention obtained in Example 5.

TABLE 5

| | Alumina Content (% by weight) | Appearance of Woven Fabric | Tensile Strength of Warp (kg/mm$^2$) | Tensile Modulus of Elasticity of Weft (t/mm$^2$) |
| --- | --- | --- | --- | --- |
| Example 5 | 98.6 | good | 275 | 28.5 |
| Compara- | 94.5 | good | 275 | 22.3 |

TABLE 5-continued

| | Alumina Content (% by weight) | Appearance of Woven Fabric | Tensile Strength of Warp (kg/mm²) | Tensile Modulus of Elasticity of Weft (t/mm²) |
|---|---|---|---|---|
| tive Example 3 | | | | |

EXAMPLE 6

A silicon carbide fiber (1,800 d/500 f)(Nicaron supplied by Nippon Carbon) and an aromatic polyamide fiber (Kevlar K-49-380d-965 supplied by Du Pont) were warped at a density of 10 warps per inch according to customary procedures, and the same high-purity alumina continuous filament for weaving as used in Example 1 (Run No. 2) was picked as the weft at a density of 10 wefts per inch by using a rapier loom, whereby a silicon carbide fiber/aromatic polyamide fiber/high-purity alumina fiber hybrid woven fabric was obtained.

The obtained woven fabric had a good appearance, the tensile strength of the silicon carbon fiber as the warp was 210 kg/mm² and the tensile modulus of elasticity of the high-purity alumina continuous filament as the weft was 28.5 t/mm², and thus, it was confirmed that the obtained hybrid woven fabric had a high strength and a high modulus of elasticity.

INDUSTRIAL APPLICABILITY

The present invention can be utilized as a reinforcing fibrous substrate of a fiber-reinforced composite material and a heat-insulating material.

We claim:

1. A high-purity alumina continuous filament woven fabric comprising a high-purity alumina continuous filament having an alumina content of at least 95% by weight and a filament diameter of 5 to 20 μm, having been woven from high-purity alumina continuous filament to which an epoxy resin sizing agent has been applied before weaving and which has been removed after weaving.

2. A woven fabric as set forth in claim 1, wherein the alumina content is at least 98% by weight.

3. A woven fabric as set forth in claim 1, wherein the high-purity alumina continuous filament is a multi-filament yarn comprising 200 to 10,000 filaments.

4. A woven fabric as set forth in claim 1, which is a plain weave, a twill weave, a satin weave or a leno cloth.

5. A high-purity alumina continuous filament hybrid woven fabric comprising a high-purity alumina continuous filament having an alumina content of at least 95% by weight and a filament diameter of 5 to 20 μm and a high-strength continuous filament having a tensile strength of at least 200 kg/mm².

6. A woven fabric as set forth in claim 5, wherein the alumina content of the high-purity alumina continuous filament is at least 98% by weight.

7. A woven fabric as set forth in claim 5, wherein the high-purity alumina continuous filament is a multi-filament yarn comprising 200 to 10,000 filaments.

8. A woven fabric as set forth in claim 5, wherein the high-strength continuous filament is selected from the group consisting of a glass fiber, a carbon fiber, a silicon carbide fiber, a Tyranno polytitanocarbosilane fiber, an ultra-high-molecular-weight polyethylene fiber and an aromatic polyamide fiber.

9. A woven fiber as set forth in claim 5, which is a plain weave, a twill weave, a satin weave or a leno cloth.

10. A high-purity alumina continuous filament for weaving, which comprises a high-purity alumina continuous filament having an alumina content of at least 95% by weight and a filament diameter of 5 to 20 μm, which is coated with 1 to 7% by weight of an epoxy resin.

11. A continuous filament as set forth in claim 10, wherein the alumina content is at least 98% by weight.

12. A continuous filament as set forth in claim 10, which is a multi-filament yarn comprising 200 to 10,000 filaments.

13. A continuous filament as set forth in claim 10, wherein the epoxy resin is selected from the group consisting of a bisphenol A type epoxy resin, a novolak type epoxy resin, an alicyclic epoxy resin and a linear aliphatic epoxy resin.

14. A continuous filament as set forth in claim 13, wherein the epoxy resin is a bisphenol A type epoxy resin having an average molecular weight of 350 to 1,000.

15. A process for the preparation of a high-purity alumina continuous filament woven fabric, which comprises weaving a high-purity alumina continuous filament having an alumina content of at least 95% by weight and a filament diameter of 5 to 20 μm, wherein an epoxy resin is applied to the high-purity alumina continuous filament.

16. A process according to claim 15, wherein, the epoxy resin is selected from the group consisting of a bisphenol A type epoxy resin, a novolak type epoxy resin, an alicyclic epoxy resin and a linear aliphatic epoxy resin.

17. A process according to claim 16, wherein the epoxy resin is a bisphenol A type epoxy resin having an average molecular weight of 350 to 1,000.

18. A process according to claim 15, wherein the epoxy resin is applied in the form of a solution or emulsion to the fiber and is then heat-treated at a temperature of 200° to 250° C. for 30 to 100 seconds.

19. A process according to claim 1, wherein the solution or emulsion of the epoxy resin has a concentration of 10 to 30% by weight.

20. A process according to claim 15, wherein the epoxy resin is applied in an amount of 1 to 7% by weight based on the high-purity alumina continuous filament.

21. A process according to claim 15, wherein the weaving is carried out by a rapier loom.

22. A process for the preparation of a high-purity alumina continuous filament hybrid woven fabric, which comprises weaving a high-purity alumina continuous filament having an alumina content of at least 95% by weight and a filament diameter of 5 to 20 μm and a high-strength continuous filament having a tensile strength of at least 200 kg/mm² to form a hybrid woven fabric, wherein an epoxy resin is applied to the high-purity alumina continuous filament.

23. A process according to claim 22, wherein the epoxy resin is selected from the group consisting of a bisphenol A type epoxy resin, a novolak type epoxy resin, an alicyclic epoxy resin and a linear aliphatic epoxy resin.

24. A process according to claim 23, wherein the epoxy resin is a bisphenol A type epoxy resin having an average molecular weight of 350 to 1,000.

25. A process according to claim 22, wherein the epoxy resin is applied in the form of a solution or emulsion to the fiber and is then heat-treated at a temperature of 200° to 250° C. for 30 to 100 seconds.

26. A process according to claim 25, wherein the solution or emulsion of the epoxy resin has a concentration of 10 to 30% by weight.

27. A process according to claim 22, wherein the epoxy resin is applied in an amount of 1 to 7% by weight based on the high-purity alumina continuous filament.

28. A process according to claim 22, wherein the weaving is carried out by a rapier loom.

29. A process for the preparation of a high-purity alumina continuous filament for weaving, which comprises applying an epoxy resin to a high-purity alumina continuous filament having an alumina content of at least 95% by weight and a filament diameter of 5 to 20 μm and heat-treating the epoxy resin-applied continuous filament.

30. A process according to claim 29, wherein the epoxy resin is selected from the group consisting of a bisphenol A type epoxy resin, a novolak type epoxy resin, an alicyclic epoxy resin and a linear aliphatic epoxy resin.

31. A process according to claim 30, wherein the epoxy resin is a bisphenol A type epoxy resin having an average molecular weight of 350 to 1,000.

32. A process according to claim 29, wherein the epoxy resin is applied in the form of a solution or emulsion to the continuous filament and the epoxy resin-applied continuous filament is heat-treated at a temperature of 200° to 250° C. for 30 to 100 seconds.

33. A process according to claim 32, wherein the solution or emulsion of the epoxy resin has a concentration of 10 to 30% by weight.

34. A process according to claim 29, wherein the amount of the epoxy resin applied to the high-purity alumina continuous filament is 1 to 7% by weight.

* * * * *